Patented Dec. 27, 1949

2,492,266

UNITED STATES PATENT OFFICE 2,492,266

TETRAHYDRODICYCLOPENTADIENE ETHER COMPOUNDS AND INSECTICIDES THEREOF

George Allen Buntin, Wilmington, Del., assignor to Hercules Powder Company, Wilmington, Del., a corporation of Delaware No Drawing. Application October 15, 1947, Serial No. 780,102

11 Claims. (Cl. 167—30)

This invention relates to new polychloro ethers and, more particularly, to chlorinated ethers of hydroxydihydrodicyclopentadiene and to insecticidal compositions containing these new products as the toxic ingredient.

It is known that ethers of hydroxydihydrodicyclopentadiene may be obtained by the addition of an alcohol to one of the double bonds of dicyclopentadiene in the presence of an acidic catalyst. The remaining double bond of the dicyclopentadiene ring will undergo further addition reactions, as with halogen, etc. These dihalo ethers, such as the dichloro ether, have many valuable properties but lack any insecticidal activity.

Now in accordance with this invention it has been discovered that alkyl ethers of hydroxydihydrodicyclopentadiene may be chlorinated to prepare polychloro alkoxytetrahydrodicyclopentadienes containing from about 50% to about 75% of chlorine and that compositions containing these polychloro ethers have a high degree of insecticidal activity.

The following examples illustrate the preparation of the new polychloro ethers in accordance with this invention and the insecticidal activity of compositions containing them as the toxic ingredient. All parts and percentages are by weight unless otherwise indicated.

Example 1

β-chloroethoxydihydrodicyclopentadiene was prepared by heating a mixture of 500 parts of ethylene chlorohydrin, 750 parts of dicyclopentadiene, and 5.5 parts of concentrated sulfuric acid to a temperature of 110° C. for four hours, the mixture being agitated during the heating period. The reaction mixture was then dissolved in petroleum ether, washed with water until neutral, and dried over sodium sulfate. The petroleum ether was removed by distillation under reduced pressure and, on continuing the distillation, 488 parts of the product were collected at 95°–105° C. at 0.3 mm. pressure. On analysis it was found to contain 15.7% chlorine.

Two hundred parts of the above ether were dissolved in 600 parts of carbon tetrachloride. Chlorine was then passed into the agitated solution in the presence of ultraviolet light, the temperature being kept below 30° C. during the chlorination. Samples were removed after 7½, 16½ and 25½ hours of chlorination. The carbon tetrachloride was removed from each of these samples by distillation under reduced pressure using a nitrogen sparge. The product in each case was a viscous, yellow liquid. The three polychloro β-chloroethoxytetrahydrodicyclopentadienes were tested for their insecticidal activity against houseflies. In this and the following examples, the test for insecticidal activity against houseflies was made in the following manner and is referred to in this specification as the bell jar method.

Approximately 100 five-day old flies (*Musca domestica*) were placed in a bell jar and a predetermined quantity of the insecticide to be tested was atomized into the bell jar. The quantity of insecticide used was equal to the amount of the Official Test Insecticide which was necessary to give a 30%–55% kill and must be within the limits of 0.4–0.6 ml. After spraying the insecticide into the chamber, the flies were placed in an observation cage containing a wad of cotton wet with a dilute sugar solution. At the end of 24 hours, the number of dead and moribund flies were counted. All tests were carried out at 80°–90° F. and 50%–70% relative humidity.

The results of the analysis for chlorine content and of tests made on solutions in deodorized kerosene of the above three polychloro ethers are given in the following table. The data are an average of tests made on each solution.

| Per Cent Chlorine | 5% Solution | | 2½% Solution | | 1% Solution | |
|---|---|---|---|---|---|---|
| | 24-Hr. Kill | O. T. I. Difference | 24-Hr. Kill | O. T. I. Difference | 24-Hr. Kill | O. T. I. Difference |
| 61.4 | 97 | +46 | 89 | +38 | ------ | ------ |
| 66.1 | 100 | +49 | 98 | +47 | 67 | +16 |
| 67.1 | 99 | +48 | 100 | +49 | 68 | +17 |

Example 2

Isopropoxydihydrodicyclopentadiene was prepared by heating a mixture of 500 parts of isopropyl alcohol, 930 parts of dicyclopentadiene and 18 parts of concentrated sulfuric acid to reflux temperature for 8 hours. The reaction mixture was then poured into water and the organic layer was diluted with petroleum ether and washed with sodium bicarbonate until neutral. The petroleum ether solution was dried over anhydrous sodium sulfate and subjected to fractional distillation. The fraction boiling at 120°–123° C. at 20 mm. pressure was collected and identified as isopropoxydihydrodicyclopentadiene.

Eighty-four parts of the above isopropoxydihydrodicyclopentadiene were dissolved in 700 parts of carbon tetrachloride. Chlorine was passed into the agitated solution in the presence of ultraviolet light, the temperature rising to about 66°

C. during the chlorination. Samples were removed after 7½ and 18½ hours of chlorination. The carbon tetrachloride was removed from each of these samples by distillation under reduced pressure using a nitrogen sparge. The product in each case was a viscous red liquid. These polychloro isopropoxytetrahydrodicyclopentadienes were tested for their insecticidal activity against house flies by the bell jar method. The results of the analysis for chlorine content and of the tests made on 10% solutions of the above two polychloro ethers in a 2:1 mixture of deodorized kerosene and acetone are given in the following table:

| Per cent Chlorine | 24-Hr. Kill | O. T. I. Difference |
|---|---|---|
| 58.5 | 98 | +56 |
| 63.2 | 80 | +38 |

*Example 3*

Isobornyloxydihydrodicyclopentadiene was prepared by heating a mixture of 88 parts of hydroxydihydrodicyclopentadiene, 95 parts of camphene, and 5 parts of an activated clay catalyst to 110° C. for 8 hours. The reaction mixture was cooled and filtered to remove the clay catalyst and then was distilled under reduced pressure. The fraction boiling at 150°–160° C. at 0.5 mm. pressure was a viscous light yellow liquid which was identified as isobornyloxydihydrodicyclopentadiene.

Eighty-five parts of the above isobornyl ether were dissolved in 790 parts of carbon tetrachloride. Chlorine was passed into the agitated solution in the presence of ultraviolet light, the temperature rising to about 70° C. during the chlorination. Samples were removed after 1½ and 3 hours of chlorination. The carbon tetrachloride was removed from each of these samples by distillation under reduced pressure using a nitrogen sparge. The product in each case was a viscous red liquid which upon cooling became a brittle resin. These polychloro isobornyloxytetrahydrodicyclopentadienes were tested for their insecticidal activity against house flies by the bell jar method. The results of the analysis for chlorine content and of tests made on solutions in deodorized kerosene are given in the following table:

| Per Cent Chlorine | 5% Solution | | 2-1-2% Solution | |
|---|---|---|---|---|
| | 24-Hr. Kill | O. T. I. Difference | 24-Hr. Kill | O. T. I. Difference |
| 61.4 | 99 | +58 | 76 | +26 |
| 70.5 | 98 | +57 | 60 | +10 |

The polychloro alkoxytetrahydrodicyclopentadienes in accordance with this invention should contain an amount of chlorine of from about 50% to about 75% and, preferably, from about 57% to about 72%. In the case of the polychloro ethoxytetrahydrodicyclopentadienes of the foregoing examples, this corresponds to about five to fourteen chlorine atoms whereas, in the case of the polychloro isobornyl ether, it corresponds to about eight to twenty-two chlorine atoms.

These new polychloro alkoxytetrahydrodicyclopentadienes may be obtained by chlorinating an alkyl or chloroalkyl ether of hydroxydihydrodicyclopentadiene. The ethers from which the polychloro derivatives are prepared in accordance with this invention may be any aliphatic, cycloaliphatic, chloroaliphatic, or chlorocycloaliphatic ether of hydroxydihydrodicyclopentadiene. Such ethers are readily prepared by the addition of an alcohol to dicyclopentadiene in the presence of an acidic catalyst. The alcohols which may be added to dicyclopentadiene to form the intermediates used to prepare the polychloro ethers may be any alkanol, such as methyl, ethyl, isopropyl, butyl, amyl, hexyl, etc., alcohols or any chloroalkanol, such as ethylene chlorohydrin, etc. The cycloaliphatic ethers, such as the terpene ethers, are readily formed by the addition of the unsaturated terpene to hydroxydihydrodicyclopentadiene. Any terpene may be used in preparing these cycloaliphatic ethers as, for example, camphene, piene, dipentene, terpinene, etc.

The reaction between the alcohol and the dicyclopentadiene is readily carried out in the presence of an acidic condensing agent, such as sulfuric acid, alkyl or aryl sulfonic acids, boron trifluoride, or its molecular complexes, etc. The temperature at which the reaction is carried out may vary from a temperature as low at 0° C. to a temperature of 125° C. or higher, the actual temperature used usually being determined by the catalyst, solvent for the reaction if one is used, etc.

When alcohol is added to dicyclopentadiene in the presence of an acid catalyst, it is believed that the alcohol adds to the endomethylene cycle; i. e., the double bond in the six-membered ring, with saturation of the double bond. Simultaneously, a rearrangement is believed to occur, the molecule changing from an endo configuration to an exo configuration. While it is believed to be quite well established that the ether so prepared has an exo configuration, the configuration of the cyclic structure is not believed to be material to the present invention. In the chlorination of the ether, the configuration, whether it be endo or exo, is not believed to be disturbed. The insecticidal activity of the polychloro ethers of this invention is not believed to be dependent upon the endo-exo configuration but is, instead, believed to be dependent upon the combination of percent of chlorine in the molecule together with the dicyclopentadiene structure (endo or exo) and the ether linkage. As used in this application and the claims appended, the term "polychloro alkoxytetrahydrodicyclopentadiene" is meant to include both the endo and exo forms.

The chlorination of the alkyl ethers of hydroxydihydrodicyclopentadiene may be carried out in the presence or absence of a solvent. Lower temperatures are maintained during the chlorination if a solvent is used. However, in some instances it is preferable to use high temperatures in order to obtain the desired degree of chlorination. Suitable solvents for the chlorination are chloroform, carbon tetrachloride, pentachloroethane, etc. A chlorination catalyst may be used if desired, ultraviolet light being particularly effective.

The new polychloro alkoxytetrahydrodicyclopentadienes containing from about 50% to about 75% of chlorine and preferably from about 57% to about 72% chlorine have a high degree of insecticidal activity and may be used as the toxicant in insecticidal compositions. Chlorinated ethers of hydroxydihydrodicyclopentadiene having a chlorine content less than 50% are so inactive as to be worthless as insecticides. The polychloro alkoxytetrahydrodicyclopentadienes, such as polychloro ethoxytetrahydrodicyclopentadiene, may be a single compound or a mixture of polychloro ethoxytetrahydrodicyclopentadienes which has an average chlorine content of from about 55% to about 75%.

The insecticidal compositions of this invention may be made up of these polychloro alkoxytetrahydrodicyclopentadienes admixed with any suitable type of diluent. If a liquid spray is desired, the polychloro ether may be dissolved in any suitable solvent such as deodorized kerosene, acetone, benzene, etc., or it may be dispersed in water to form an aqueous spray. Insecticidal dusts may be prepared by placing the polychloro ether on a diluent or carrier, such as powdered carbon, kieselguhr, bentonite, pyrophyllite, etc.

For many purposes it may be desirable to use the polychloro alkoxytetrahydrodicyclopentadiene in combination with other insecticidal toxicants. Many toxicants have a very high knockdown in relatively dilute solutions but, while concentrations may be used in order to obtain the desired degree of kill, due to the high degree of killing power which the polychloro ethers of this invention possess, these compounds may be added to such toxicants thereby enabling the use of much more dilute solutions than would otherwise be possible for an effective spray.

Toxicants with which these polychloro ethers may be combined include such compounds as rotenone, pyrethrum, and the organic thiocyanates, such as alkyl thiocyanate, thiocyano ethers, such as β-butoxy-β'-thiocyanoethyl ether, and terpene thiocyanoacylates, such as isobornyl thiocyanoacetate, fenchyl thiocyanoacetate, and isobornyl α-thiocyanopropionate.

As may be seen from the foregoing examples, the polychloro ethers of this invention have a high insecticidal activity. Thus, the insecticidal compositions of this invention may contain any amount of the polychloro ether that is effective against the pest being killed. For use as a household fly spray a solution containing about 2½% concentration of the toxicant may be sufficient. However, for killing many types of pests, it may be desirable to use much higher concentrations of these toxicants. The insecticidal compositions of this invention are useful in combatting flies, mosquitoes, roaches, and many other pests.

What I claim and desired to protect by Letters Patent is:

1. A polychloro ether of hydroxytetrahydrodicyclopentadiene selected from the group consisting of polychloro alkoxy- and cycloalkoxytetrahydrodicyclopentadienes containing from about 50% to about 75% chlorine.

2. A polychloro ether of hydroxytetrahydrodicyclopentadiene selected from the group consisting of polychloro alkoxy- and cycloalkoxytetrahydrodicyclopentadienes containing from about 57% to about 72% chlorine.

3. A polychloro ethoxytetrahydrodicyclopentadiene containing from about 50° to about 75% chlorine.

4. A polychloro isopropoxytetrahydrodicyclopentadiene containing from about 50% to about 75% chlorine.

5. A polychloro isobornyloxytetrahydrodicyclopentadiene containing from about 50% to about 75% chlorine.

6. An insecticidal composition comprising a polychloro ether of hydroxytetrahydrodicyclopentadiene selected from the group consisting of polychloro alkoxy- and cycloalkoxy-tetrahydrodicyclopentadienes containing from about 50% to about 75% chlorine and a hydrocarbon solvent.

7. An insecticidal composition comprising an aqueous dispersion of a polychloro ether of hydroxytetrahydrodicyclopentadiene selected from the group consisting of polychloro alkoxy- and cycloalkoxy-tetrahydrodicyclopentadienes containing from about 50% to about 75% chlorine.

8. An insecticidal composition comprising a polychloro ether of hydroxytetrahydrodicyclopentadiene selected from the group consisting of polychloro alkoxy- and cycloalkoxy-tetrahydrodicyclopentadienes containing from about 50% to about 75% chlorine and a solid carrier.

9. An insecticidal composition comprising a polychloro ethoxytetrahydrodicyclopentadiene containing from about 57% to about 72% chlorine and a hydrocarbon solvent.

10. An insecticidal composition comprising an aqueous dispersion of a polychloro ethoxytetrahydrodicyclopentadiene containing from about 57% to about 72% chlorine.

11. An insecticidal composition comprising a polychloro ethoxytetrahydrodicyclopentadiene containing from about 57% to about 72% chlorine and a solid carrier.

GEORGE BUNTIN.

REFERENCES CITED

The following references are of record in the file of this patent:

UNITED STATES PATENTS

| Number | Name | Date |
|---|---|---|
| 2,010,841 | Bender | Aug. 13, 1935 |
| 2,237,356 | Merill | Apr. 8, 1941 |
| 2,394,582 | Bruson | Feb. 12, 1946 |

Certificate of Correction

Patent No. 2,492,266                                               December 27, 1949

GEORGE ALLEN BUNTIN

It is hereby certified that errors appear in the printed specification of the above numbered patent requiring correction as follows:

Column 4, line 18, for "piene" read *pinene*; column 6, line 7, for "50°" read *50%*; and that the said Letters Patent should be read with these corrections therein that the same may conform to the record of the case in the Patent Office.

Signed and sealed this 11th day of April, A. D. 1950.

[SEAL]

THOMAS F. MURPHY,
*Assistant Commissioner of Patents.*